(12) United States Patent
Stratigakis

(10) Patent No.: US 7,397,786 B2
(45) Date of Patent: *Jul. 8, 2008

(54) HARDWARE ASSIST SYSTEM AND METHOD FOR THE TIMING OF PACKETS IN A WIRELESS NETWORK

(75) Inventor: John Stratigakis, Medina, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/747,689

(22) Filed: May 11, 2007

(65) Prior Publication Data

US 2007/0206560 A1 Sep. 6, 2007

Related U.S. Application Data

(63) Continuation of application No. 10/192,949, filed on Jul. 11, 2002, now Pat. No. 7,233,588.

(51) Int. Cl.
*H04J 3/06* (2006.01)
(52) U.S. Cl. ..................................... 370/350
(58) Field of Classification Search ......... 370/229–231, 370/310–312, 339–350, 464, 465, 470–472, 370/220; 455/1, 130, 226, 552; 375/220
See application file for complete search history.

(56) References Cited

U.S. PATENT DOCUMENTS

| 5,027,428 | A | 6/1991 | Ishiguro et al. |
| 5,220,564 | A | 6/1993 | Tuch et al. |
| 5,276,680 | A | 1/1994 | Messenger |
| 5,592,483 | A * | 1/1997 | Hieda et al. ................. 370/445 |
| 5,663,715 | A | 9/1997 | Godoroia |
| 5,838,720 | A | 11/1998 | Morelli |
| 5,933,435 | A | 8/1999 | Shah et al. |
| 6,236,674 | B1 | 5/2001 | Morelli et al. |
| 6,546,062 | B1 | 4/2003 | Du et al. |
| 6,721,302 | B1 * | 4/2004 | Alastalo ..................... 370/346 |
| 6,978,149 | B1 | 12/2005 | Morelli |
| 7,020,097 | B2 | 3/2006 | Hur et al. |
| 7,058,074 | B2 | 6/2006 | Ho et al. |
| 7,239,648 | B1 * | 7/2007 | Feng et al. .................. 370/470 |
| 2003/0072316 | A1 | 4/2003 | Niu et al. |
| 2003/0091066 | A1 | 5/2003 | Choi et al. |
| 2007/0086327 | A1 * | 4/2007 | Langley et al. .............. 370/205 |

OTHER PUBLICATIONS

IEEE—Local and Metropolitan Area Networks, Std 802.11, §12—Physical Layer (PHY) Service Specification, pp. 152-160 Copyright © 1997 IEEE.

* cited by examiner

*Primary Examiner*—Dmitry Levitan
(74) *Attorney, Agent, or Firm*—Tucker Ellis & West LLP

(57) ABSTRACT

In a wireless local area network ("WLAN"), a system and method for assisting the timing calculation associated with the transmission timing of packets or data frames through the air. The present utilizes the baseband PHY processor to detect the trailing edge of the radio frequency ("RF") packet and prevents the WLAN device from transmitting for a pre-determined amount of time. This improved system and method thereby frees the medium access controller ("MAC") from utilizing significant microprocessor cycles for synchronization calculations and thereby increases system throughput and reduces the possibility of fast-turnaround protocol timing errors.

15 Claims, 4 Drawing Sheets

HARDWARE ASSIST SYSTEM AND METHOD FOR THE TIMING OF PACKETS IN A WIRELESS NETWORK

CROSS-REFERENCE TO RELATED APPLICATIONS

This application is a continuation of U.S. patent application Ser. No. 10/192,949 filed on Jul. 11, 2002, now U.S. Pat. No. 7,233,588 the entirety of which is incorporated herein.

FIELD OF INVENTION

The present invention relates generally to implementation of wireless local area network ("WLAN") devices that detect the trailing edge of the radio frequency ("RF") packet and prevents the WLAN device from transmitting for a pre-determined amount of time without performing complex synchronization calculations on the medium access controller ("MAC") and thereby increasing system throughput.

BACKGROUND OF THE INVENTION

The use of wireless networks has increased dramatically. WLANs are now commonplace in the modern workplace and becoming more prevalent in many universities and households in the United States. A WLAN offers several advantages over regular local area networks ("LANs"). For example, users are not confined to specified locations previously wired for network access, wireless work stations are relatively easy to link with an existing LAN without the expense of additional cabling or technical support; and WLANs provide excellent alternatives for mobile or temporary working environments.

There are generally two types of WLANs, independent and infrastructure WLANs. The independent, or peer-to-peer, WLAN is the simplest configuration and connects a set of personal computers with wireless adapters. Any time two or more wireless adapters are within range of each other, they can set up an independent network. In infrastructure WLANs, multiple access points link the WLAN to the wired network and allow users to efficiently share network resources. The access points not only provide communication with the wired network, but also mediate wireless network traffic in the immediate neighborhood. Both of these network types are discussed extensively in the IEEE 802.11 standard for WLANs.

In the majority of applications, WLANs are of the infrastructure type. That is, the WLAN typically includes a number of fixed access points, also known as base stations, interconnected by a cable medium to form a hardwired network. The hardwired network is often referred to as a system backbone and may include many distinct types of nodes, such as, host computers, mass storage media, and communications ports. Also included in the typical WLAN are intermediate base stations which are not directly connected to the hardwired network.

These intermediate access points, often referred to as wireless base stations, increase the area within which access points connected to the hardwired network can communicate with mobile terminals. Associated with each access point or base station is a geographical cell. A cell is a geographic area in which an access point has sufficient signal strength to transmit data to and receive data from a mobile terminal with an acceptable error rate. Unless otherwise indicated, the term access point or base station, will hereinafter refer to access points hardwired to the network and wireless base stations.

Typically, the access point connects to the wired network from a fixed location using standard Ethernet cable, although in some cases the access point may function as a repeater and have no direct link to the cable medium. Minimally, the access point receives, buffers, and transmits data between the WLAN and the wired network infrastructure. A single access point can support a small group of users and can function within a predetermined range.

In general, end users access the WLAN through WLAN adapters, which are commonly implemented as Personal Computer Memory Card International Association or Peripheral Component Microchannel Interconnect Architecture, commonly referenced as "PCMCIA" cards in notebook computers, Industry Standard Architecture ("ISA") or Peripheral Component Interface ("PCI") cards in desktop computers, or fully integrated devices within hand-held computers. WLAN adapters provide an interface between the client network operating system and the airwaves. Typically, the nature of the wireless connection is transparent to the network operating system.

In general operation, when a mobile terminal or a portable unit is powered up, it "associates" with an access point through which the mobile terminal can maintain wireless communication with the network. In order to associate, the mobile terminal must be within the cell range of the access point and the access point must likewise be situated within the effective range of the mobile terminal. Upon association, the mobile unit is effectively linked to the entire LAN via the access point. As the location of the mobile terminal changes, the access point with which the mobile terminal was originally associated may fall outside the range of the mobile terminal. Therefore, the mobile terminal may "de-associate" with the access point it was originally associated to and associate with another access point which is within its communication range.

Due to the multiple sources and types of communications which occur over a WLAN, signals are encoded over multiple channels using complex modulation techniques, such as orthogonal frequency division multiplexing ("OFDM") whereby the datastream is split into multiple RF channels. Note, the invention described below, can be applied to any wireless medium that utilizes complex encoding of the packet or data frame, including the IEEE 802.11g standard. Due to the complex encoding schemes utilized in WLAN's and the variable packet size discussed below, complex calculations must occur in a very short amount of time to maintain compliance with various WLAN standards such as 802.11 and to maintain a high system throughput.

In meeting the responsibilities set forth above, a significant portion of the MAC processing time is spent determining the proper time to send an acknowledgement ("ACK") signal. In 802.11a, the MAC must send an acknowledgement ("ACK") signal within a short inter frame space ("SIFS") of 16 μs from receiving the end of a packet.

One problem associated with the prior method is that the MAC does not have any knowledge of the received signal envelope in the air, since the symbol decoding process takes some variable amount of time, the MAC processor typically has to respond to the incoming packet in a very short amount of time with accurate timing, as stated above, within a SIFS. Currently, there is a fixed timing reference point in the packet to determine timing. In many cases, this fixed timing reference will be generated before any packet data is transferred. A timing reference may be difficult to detect while the MAC processor is busy receiving packet data. However, given this timing reference at the beginning of the packet, it is still quite difficult to determine the end of the packet or data frame. The total time of the packet must be calculated using a complex algorithm, and an adjustment must be applied based on the knowledge of the relationship between the beginning of the packet and the timing reference signal. Given the decoding delay of the received data, this calculation must be performed in a very short amount of time.

As shown in FIG. 1, the leading edge of the Timing Reference signal has a fixed relationship to the RF Packet, but the trailing edge of the Timing Ref signal is variable (shown in FIG. 1 as the crossed section 112 of the Timing Ref signal). This is typical because of the varying decoder delays depending on the length of the packet and the data rate. In order to transmit the ACK with the correct 16 µs timing at the end of the packet, the total length of the packet must be calculated, then the time "A" (shown in FIG. 1) must be subtracted from it, and the 16 µs delay must be added to it. As will be understood by those skilled in the art, the time "A" corresponds to the time from the beginning of the receipt of the RF Packet to the beginning of the Timing Ref signal. The length calculation for 802.11a is $$TXTIME = T_{PREAMBLE} + T_{SIGNAL} + T_{SYM} * \text{Ceiling}((16 + 8*LENGTH + 6)/N_{DBPS})$$

Where the TXTIME is the entire time for the transmitting the sum of the following variables: the packet preamble ($T_{PREAMBLE}$), the time to transmit the signal field ($T_{SIGNAL}$), and the time to transmit the data portion of the packet ($T_{SYM}$*Ceiling ((16+8*LENGTH+6)/$N_{DBPS}$)), where $T_{SYM}$ is the symbol time in microseconds, LENGTH is the packet length in bytes, and $N_{DBPS}$ is the number of bits per symbol. This is an extremely complex calculation to do in real time and will take a significant amount of processor cycles to accomplish. This is not a desirable solution because of the computational complexity involved and the number of MAC processor cycles required to attend to basic synchronization functions.

Thus, there exists a need for a system and method that can eliminate or significantly reduce the complexity of the above calculation or thereby free the MAC processor from performing this synchronization task and thereby increase throughput of the WLAN system and eliminate timing errors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

According to the present invention there is provided a system and method for use in a WLAN that reduces the processing load placed on the MAC processor and thereby increases the throughput of the network. The present invention addresses the problems discussed above and eliminates the complex calculation for the transmit time required prior to sending the ACK signal. In the preferred embodiment, this is accomplished by implementing a timer on a processor (hereinafter the "PHY" processor), which references a special electronic integrated circuit or functional block of a circuit, that is triggered when the trailing edge of the received signal or data frame is detected.

This present invention makes use of the fact that the PHY is the only part of the WLAN system that has explicit knowledge of the received signal envelope or data frame in the air. This permits the PHY to determine when to send the ACK signal and thereby increases system throughput in a WLAN by allowing the MAC to spend its processing time on other tasks not related to the complex synchronization calculations.

BRIEF DESCRIPTION OF THE DRAWINGS

The present invention may take physical form in certain parts and arrangements of parts, a preferred embodiment and system and method of which will be described in detail in this specification and illustrated in the accompanying drawings which form a part hereof, and wherein.

DETAILED DESCRIPTION OF THE INVENTION

It should be appreciated that a preferred embodiment of the present invention as described herein makes particular reference to the IEEE 802.11 standard and utilizes terminology referenced therein. However, it should be understood that reference to the IEEE 802.11 standard and its respective terminology is not intended to limit the scope of the present invention. In this regard, the present invention is suitably applicable to a wide variety of other communication systems which utilize a plurality of operating frequencies for data transmission. Moreover, it should be appreciated that while the present invention has been described in connection with a wireless local area network (WLAN), the present invention is suitable for use in connection with other types of wireless networks, including a wireless wide area network (WWAN), a wireless metropolitan area network (WMAN) and a wireless personal area network (WPAN).

Figure 2:
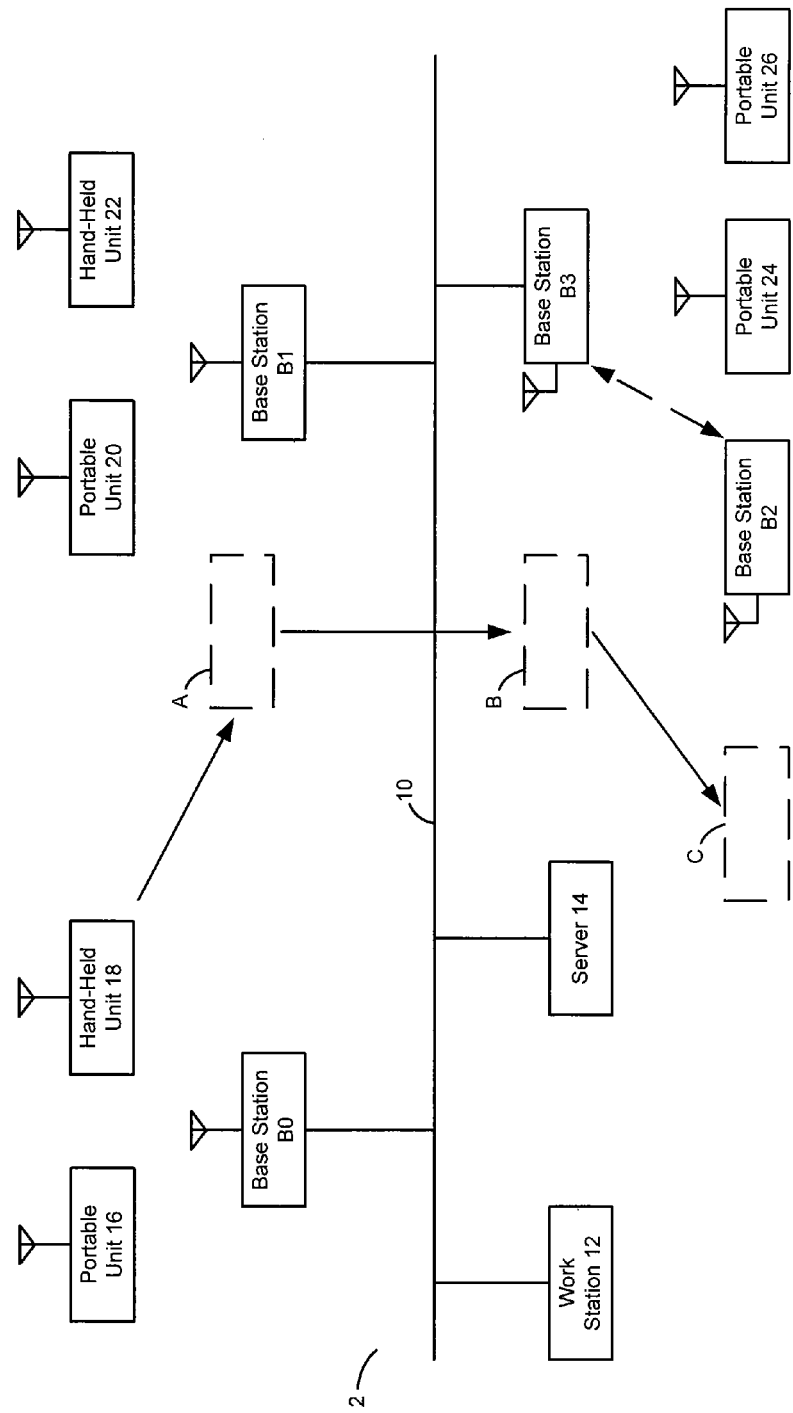
FIG. 2 is an exemplary representation of a network comprising access points coupled to a cable medium by radio links for transmission of data in packet form.

The basic communications underlying WLANs is shown in FIG. 2. More specifically, FIG. 2 shows a WLAN system 2 generally comprised of a plurality of communication devices including mobile stations (i.e., portable units 16, 20, 22, 24 and 26, and hand-held unit 18) and a plurality of base stations (also commonly referred to as access points) B0, B1, B2, and B3. The base stations may be connected to a hardwired network backbone or serve as wireless base stations. Each base station can transmit and receive data in its respective cell. WLAN system 2 also includes a cable medium, namely, an Ethernet cable 10, along which all network data packets are transmitted when conveyed between any two network nodes. The principal nodes are direct-wired to the cable 10. These include a work station 12 and a network server 14, but may include a mainframe computer, communication channels, shared printers and various mass storage.

In WLAN system 2, base station B2 effectively operates as a repeater, coupled to the cable 10 by the base station B3 and a radio link with the base station B3. Base station B2 has been termed a "base station" because it registers mobile stations in the same manner as the base stations that are direct-wired to the cable 10, and offers the same basic registration services to the mobile stations. The base station B2 and each device to which it offers packet transferring services will, however, be registered with the base station B3 to ensure that packets intended for or transmitted by devices associated with the base station B2 are properly directed through the base station B2.

Several LANs are present in the WLAN system 2. These LAN's are not specifically indicated, but each is effectively defined by the area which a single base station can serve, given limited transmission power, and the devices within that area. One LAN is served by the base station B0 and currently contains a portable unit 16, such as a line-powered personal computer, and a battery-powered hand-held unit 18. A second LAN is served by another base station B1 and currently contains two portable units 20, 22. A third LAN is served by the other wired base station B3 and also contains two portable units 24, 26. A fourth LAN is served by the base station B2, and no network device is currently within the range of that base station. The cable 10 and its nodes are also treated effectively as a LAN. It should be noted that all transmission between devices in different LAN's is via the cable 10. Only transmissions between devices in a single LAN avoid using the cable 10, but such matters are not discussed extensively herein.

General operation of the network to accommodate movement of the hand-held unit 18 will now be described. The hand-held unit 18 is assumed to be registered initially with the base station B0. The base station B0 is also assumed to have undelivered packets addressed to the hand-held unit 18. The hand-held unit 18 is assumed then to move to position A, illustrated in phantom outline in FIG. 2, assumed to be beyond the transmission range of the base station B0. The hand-held unit 18 transmits polling packets at intervals, following its power-saving routine, with no response from the base station B0. After a predetermined number of attempts to poll the base station B0, the hand-held unit 18 causes transmission of a packet requesting registration with a network communication base station and providing its unique network address or identification. The registration-requesting packet is assumed in this instance to be received only by the base stations B1 and B3.

It is assumed that both base stations B1 and B3 can accommodate another device. Each then transmits a response packet addressed to the hand-held unit 18 and each reserves a registration slot for a predetermined period of time. Each response packet will include the base station's unique network address and will also indicate the number of hops from the base station to the cable 10. A base station connected directly to the cable 10 is regarded as 0 hops from the cable 10. A base station that functions as a repeater returns a positive number indicating the number of intervening base stations (hops) required to couple it to the cable 10.

The hand-held unit 18 then responds to the base station response packets by selecting one of the responding base stations B1, B3. The selection is typically made according to the number of hops to the cable 10, signal strength (detected in a conventional manner), and which response packet is first received, priority being assigned in that order. In the present case, governed by the second criterion, namely, signal strength, and assuming that the closer base station B1 produces a stronger received signal, the hand-held unit 18 selects the base station B1. The hand-held unit 18 then transmits a selection packet addressed to the base station B1 requesting registration. The selected base station B1 responds to the selection packet by registering the hand-held unit 18 and begins the process of monitoring the cable 10 for packets addressed to the hand-held unit 18. Base station B1 also recognizes and conveys to the cable 10 any data packets received from the hand-held unit 18. The base station B3, not selected, but within range, does not respond to packets in the cable 10 addressed to the hand-held unit 18 and does not respond to any data packets received from the hand-held unit 18. No duplicate packets are produced within the cable 10 and no duplicate packets are transmitted through air.

Contemporaneously with registration, the selected base station B1 transmits via the cable 10 a multicast packet indicating its registration of the hand-held unit 18. The multicast packet contains a unique address for each of the network base stations. The multicast packet is conveyed via the cable 10 to the base station B0 with which the hand-held unit 18 had been registered. The base station B0 responds by immediately de-registering the hand-held unit 18, discontinuing monitoring of the cable 10 for packets addressed to the hand-held unit 18 and disregarding further packets of a general nature transmitted by the hand-held unit 18 and possibly received by the base station B1. The base station B0 also responds by transmitting along the cable 10 any undelivered packets that are addressed to the hand-held unit 18. The newly selected base station B1 retrieves the packets from the cable 10 and stores them for re-transmission to the hand-held unit 18.

The hand-held unit 18 may then move to position B shown in phantom in FIG. 2. It is assumed now to be out of range of the base station B1 but still within the range of base stations B3 and B2. After predetermined attempts to contact the base station B1 with polling packets, the hand-held unit 18 sends a packet requesting registration with a communication base station. It receives response packets only from the base stations B2, B3. The packet from base station B2 will indicate that the base station B2 is one hop away from the cable 10, that is, the base station functions as a repeater. The packet from the base station B3 indicates direct connection to the cable 10 (zero hops). The hand-held unit 18 consequently selects the base station B3 according to the criteria specified above, and transmits a packet requesting registration with the base station B3. The base station B3 responds with response packet confirming registration, assuming no intervening registrations have taken the full capacity of the base station B3. If the capacity of the base station were somehow taken, the hand-held unit 18 would repeat transmission of its selection packet, assume transmission failure, and re-initiate the process of locating an appropriate communication base station. The base station B3 also transmits via the cable 10 a multicast packet addressed to base stations indicating the registration, and the base station B1 de-registers the hand-held unit 18. The base station B1 transmits any undelivered packets addressed to the hand-held unit 18 along the cable 10, and the new base station B3 detects and stores the packets. In effect, the base station B3 is fully conditioned to continue packet transmission from where the last base station lost communication with the hand-held unit 18

In position C illustrated in phantom in FIG. 2, the hand-held unit 18 is assumed to be out of range of all base stations except the base station B2. With repeated failure in transmission of packets to the base station B3, the hand-held unit 18 transmits a packet requesting registration with a base station. Only the base station B2 responds by transmitting an appropriate packet. The selection process at the hand-held unit 18 is simplified, the only criterion to be applied is that a base station responded and was effectively the first base station to respond. The hand-held unit 18 then transmits its selection packet identifying the base station B2 and requesting registration. The base station B2 registers the hand-held unit 18, and transmits a multicast packet via the cable 10 addressed to base stations confirming the registration. The base station B3 actually places the packet on the cable 10.

General operation of the representative WLAN network 2, as discussed above, is known to those skilled in the art, and is more fully discussed in U.S. Pat. No. 5,276,680, which is fully incorporated herein by reference. From the above example, it is evident to one of ordinary skill in the art that, in practice, the MAC processor of the associated units must perform many complex tasks in a very short amount of time, albeit associating, deassociating, transferring packet data and sending the requisite confirmations in the form of ACK's. In 802.11, the MAC processor's role is made even more difficult due to the variable of the data frame.

Figure 3:
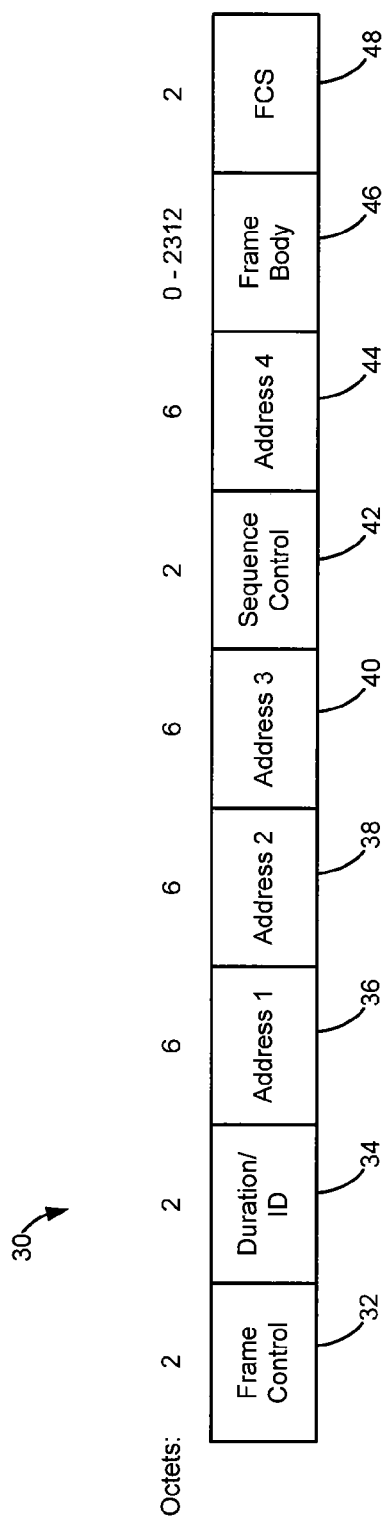
FIG. 3 is a representation of a typical 802.11 data frame.

In 802.11, the typical data frame (or packet) is shown in FIG. 3. As shown, the MAC frame format 30 comprises a set of fields that occur in a fixed order in all frames. Beginning on the left, the frame comprises a frame control field 32 that is two bytes long, a duration ID field 34 that is two bytes long, a first address field 36 that is six bytes long, a second address field 38 that is six bytes long, a third address field 40 that is six bytes long, a sequence control field 42 that is two bytes long, an optional fourth address field 44 that is six bytes long, the frame body or payload 46 that varies from zero to two thousand three hundred and twelve bytes in length, and the frame check sequence field 48. Thus, in 802.11, the length of a data frame may vary from 28 to 2346 bytes in size.

Due to the variability of the size of the frame body 46 (from 0-2,312 bytes) and the requirement of 802.11 that an entity is not permitted to transmit for at least a SIFS (16 µs for 802.11a) after a packet is received, there is no way for the MAC to efficiently make the complex calculation set forth above without wasting valuable processor resources and degrading system throughput.

Figure 4:
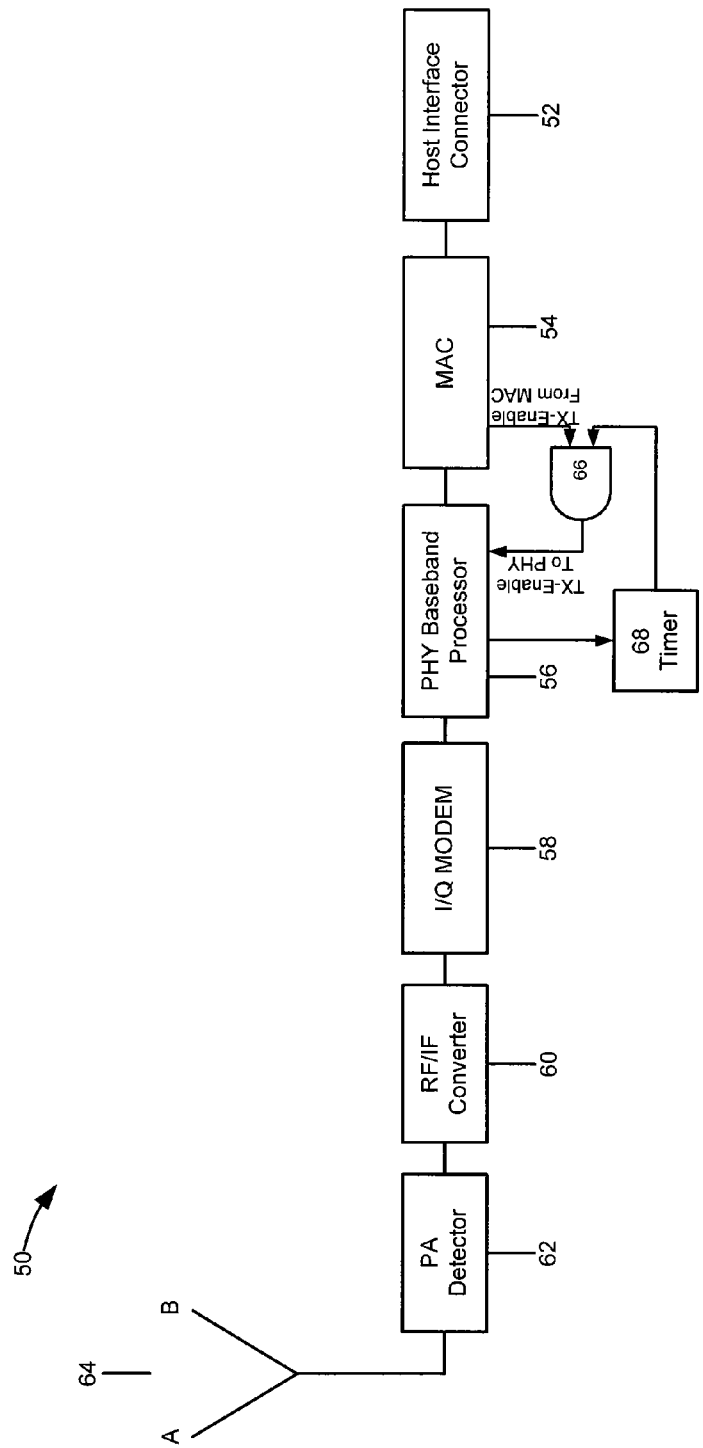
FIG. 4 is a schematic representation of the present invention.

The present invention implements a timer tied to the PHY processor 56. In the preferred embodiment, the timer is set for the SIFS period. The timer is reset and triggered when the end of the received signal is detected. A hardware implementation of the present invention is shown in FIG. 4. Typically, multiple integrated circuits are combined to implement a data communications radio 50. The primary components of the radio, from the host interface connector 52, are as follows: the media access controller 54, the baseband processor or PHY chip 56, the I/Q modulator/demodulator and synthesizer 58, the RF-to-IF converter 60, the power amplifier and detector 62, and the antennas 64A and 64B. As shown in FIG. 4, AND gate 66 is placed in series with the TX_ENABLE signal from the MAC processor 54 to the PHY baseband processor 56. The output of the timer 68 is tied to the second input of the AND gate. When the timer is triggered by the PHY detecting the trailing edge of the RF packet, the second input of the AND gate is driven to a logic '0', effectively disabling any transmit activity until the timer is expired. The precise implementation of the timer is not critical to this invention. For instance, the timer may be set for any pre-determined time, configured on the fly, set by the user, or by the system, etc. In the preferred embodiment, the timer should be set for the SIFS time, in this case 16 µs, or as required by the specific standard being practiced and is implemented in hardware.

Figure 1:
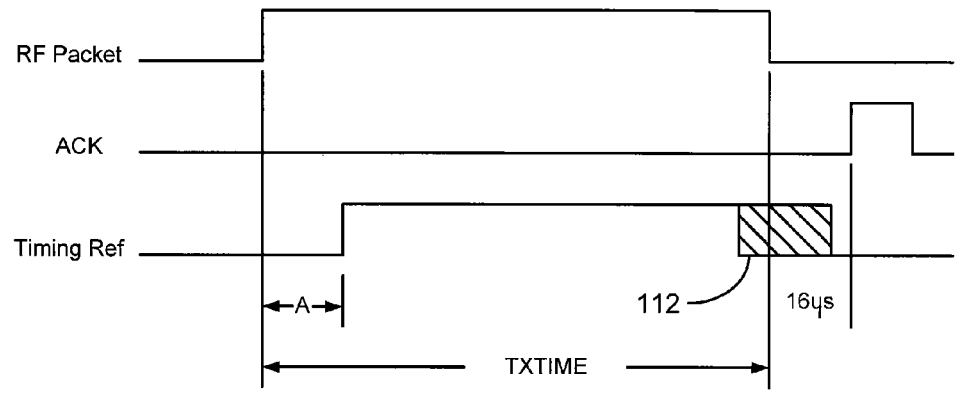
FIG. 1 is a timing diagram associated with prior art devices.
Figure 5:
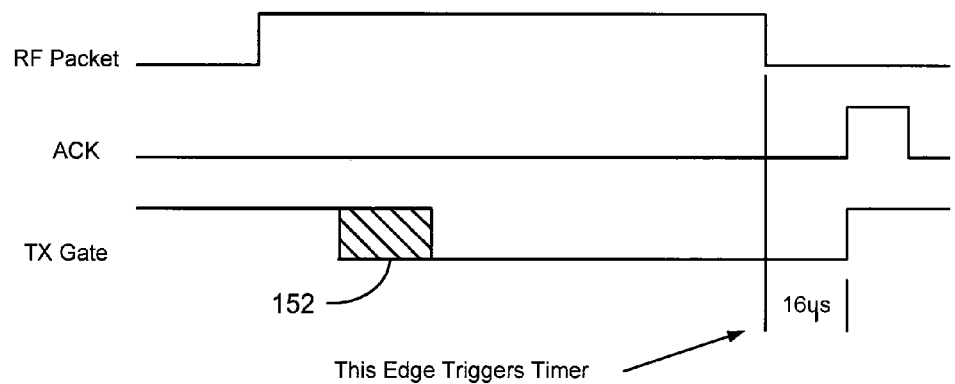
FIG. 5 is a timing diagram of the associated with the present invention.

A timing sequence of the present invention is shown in FIG. 5. As shown, the leading edge of the TX Gate signal does not have a fixed relationship to the RF Packet, as represented by the crossed portions 152 of the TX Gate signal illustrated in FIG. 5. This is permitted by the present invention since the trailing edge of the RF packet triggers the internal TX Gate timer. When the timer expires (16 µs as shown), the TX Gate signal trailing edge occurs, and the ACK signal is transmitted.

Based on the present invention, the complex transmission time calculation is not needed, thereby eliminating the packet duration calculation and packet synchronization function such that the MAC processor 54 is freed to perform other tasks, potentially increasing the throughput of the device. In addition, the present invention will also eliminate or significantly reduce the possibility of fast-turnaround protocol timing errors.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

The invention claimed is:

1. An apparatus, comprising:
 a receiver operable to receive a wireless signal;
 a transmitter operable to transmit a wireless signal;
 a detection circuit operable to detect when receiving of the wireless signal is completed coupled to the receiver; and
 a delay circuit configured to receive a signal to operate the transmitter and a signal from the detection circuit indicative of when receiving of the wireless signal is completed, the delay circuit comprises an output coupled to the transmitter;
 wherein the delay circuit is responsive to the signal from the detection circuit to delay passing the signal to operate the transmitter to the output coupled to the transmitter a predetermined time delay after the detection circuit detects receiving of the wireless signal is completed.

2. An apparatus according to claim 1, the delay circuit comprises a timer.

3. An apparatus according to claim 2, the delay circuit comprises a logical gate having a first input coupled to the timer and a second input coupled to the signal to operate the transmitter.

4. An apparatus according to claim 3, wherein the logical gate is an AND gate.

5. An apparatus according to claim 2, wherein the timer comprises an input coupled to the signal from the detection circuit indicative of when receiving of the wireless signal is completed.

6. An apparatus according to claim 5, wherein the timer is configured to be responsive to the signal from the detection circuit indicative of when receiving of the wireless signal is completed to reset the timer.

7. An apparatus according to claim 6, the timer further comprises an output, wherein the timer is configured to produce a first output responsive to being reset and a second output a predetermined time after being reset.

8. An apparatus according to claim 1, further comprising a physical layer processor coupled to the transmitter and receiver, the physical layer (PHY) processor is configured to receive the signal to operate the transmitter.

9. An apparatus according to claim 8, further comprising a media access control (MAC) processor in data communication with the PHY processor, the MAC processor is configured to determine whether to generate a response to a signal received by the receiver and processed by the PHY processor.

10. An apparatus according to claim 9, wherein the MAC processor determines the predetermined delay.

11. An apparatus according to claim 10, wherein the predetermined delay is a short inter frame space.

12. An apparatus according to claim 9, wherein the MAC processor is configured to determine whether the response is an acknowledgement (ACK) frame, the MAC processor is further configured to forward the ACK frame to the PHY processor, the PHY processor is configured to wait until the delay circuit passes the signal to operate the transmitter before transmitting the ACK.

13. An apparatus, comprising:
 a wireless transmitter;

a wireless receiver;

a physical layer (PHY) processor coupled to the receiver and responsive to receive a first data packet from the wireless receiver, the PHY is also coupled to the transmitter and operable to send a second data packet to the transmitter for wireless transmission;

a media access control (MAC) processor in data communication with the PHY processor; and a delay circuit coupled between the MAC processor and the PHY processor;

wherein the PHY processor is configured to signal the delay circuit when receiving of the first packet is completed;

wherein the MAC processor is operable to determine whether to send a response for the first packet;

wherein the MAC processor is operable to generate the second packet responsive to determining to send a response to the first packet;

wherein the MAC processor forwards the second packet to the PHY processor and signals the delay circuit to transmit the second packet; and wherein the PHY processor waits for a signal from the delay circuit before sending the second data packet to the transmitter for wireless transmission.

14. An apparatus according to claim 13, the delay circuit comprises a timer, the timer is operable to receiving a signal from the PHY processor to output a first signal for a predetermined time period and to output a second signal after the predetermined time period expires.

15. An apparatus according to claim 13, wherein the MAC processor controls the amount of time that the time delay circuit waits before sending the signal to the PHY processor for sending the second packet.

* * * * *